United States Patent [19]

Fujisaka et al.

[11] Patent Number: 5,087,917

[45] Date of Patent: Feb. 11, 1992

[54] RADAR SYSTEM

[75] Inventors: Takahiko Fujisaka; Tetsuo Kirimoto; Yoshimasa Oh-hashi; Michimasa Kondo, all of Kanagawa, Japan

[73] Assignee: Mitsubishi Denki Kabushiki Kaisha, Tokyo, Japan

[21] Appl. No.: 584,157

[22] Filed: Sep. 18, 1990

[30] Foreign Application Priority Data

Sep. 20, 1989 [JP] Japan .................................. 1-244069
Sep. 20, 1989 [JP] Japan .................................. 1-244070

[51] Int. Cl.$^5$ .............................................. G01S 13/00
[52] U.S. Cl. ........................................ 342/84; 342/81; 342/372
[58] Field of Search ........................ 342/81, 82, 84, 372

[56] References Cited

U.S. PATENT DOCUMENTS

| | | | |
|---|---|---|---|
| 4,656,479 | 3/1987 | Kirimoto et al. | 342/94 |
| 4,724,438 | 2/1988 | Arnold et al. | 342/81 |
| 4,868,574 | 9/1989 | Raab | 342/81 |
| 4,924,235 | 5/1990 | Fujsaka | 342/374 |

OTHER PUBLICATIONS

Ruvin et al, "Digital Multiple Beamforming Techniques for Radar", Eason, 1978.
U.S. Application Ser. 07/450,290 filed Dec. 13, 1989, Kirimoto, et al.

Primary Examiner—Mark Hellner
Attorney, Agent, or Firm—Wolf, Greenfield & Sacks

[57] ABSTRACT

A radar system having a phased array antenna for transmission and a digital beam forming antenna for reception for observing a plurality of targets by transmitting transmission pulses to the respective targets comprises a subtraction control circuit, a transmission timing control circuit and a transmission beam direction control circuit. The subtraction control circuit calculates a required number of transmission pulses (beams) to be transmitted for each of transmission cycles in accordance with detected Doppler frequencies of the targets, so as not to cause ambiguity on the detected Doppler frequencies, and determines a beam direction for each of transmission beams. The timing control circuit and beam direction control circuit control transmission timing and direction of the beams.

6 Claims, 6 Drawing Sheets

TRANSMISSION SYSTEM
(PRIOR ART)

Fig. 2(b)

RECEPTION SYSTEM
(PRIOR ART)

Fig. 6(a) FAST TARGET A
Fig. 6(b) SLOW TARGET B
Fig. 6(c) SLOW TARGET C
Fig. 6(d) FAST TARGET D
Fig. 6(e) SLOW TARGET E
Fig. 6(f) SLOW TARGET F

RADAR SYSTEM

BACKGROUND OF THE INVENTION

1. Field of the Invention

The present invention relates to a radar system in which a phased array antenna for transmission and a digital beamforming antenna for reception capable of forming multiple beams are utilized, and more particularly to a radar system with a transmission phased array antenna and a reception digital beam forming antenna adapted to observe targets present in a plurality of different directions in a transmission pulse repetition cycle.

2. Description of Prior Art

Figure 1:
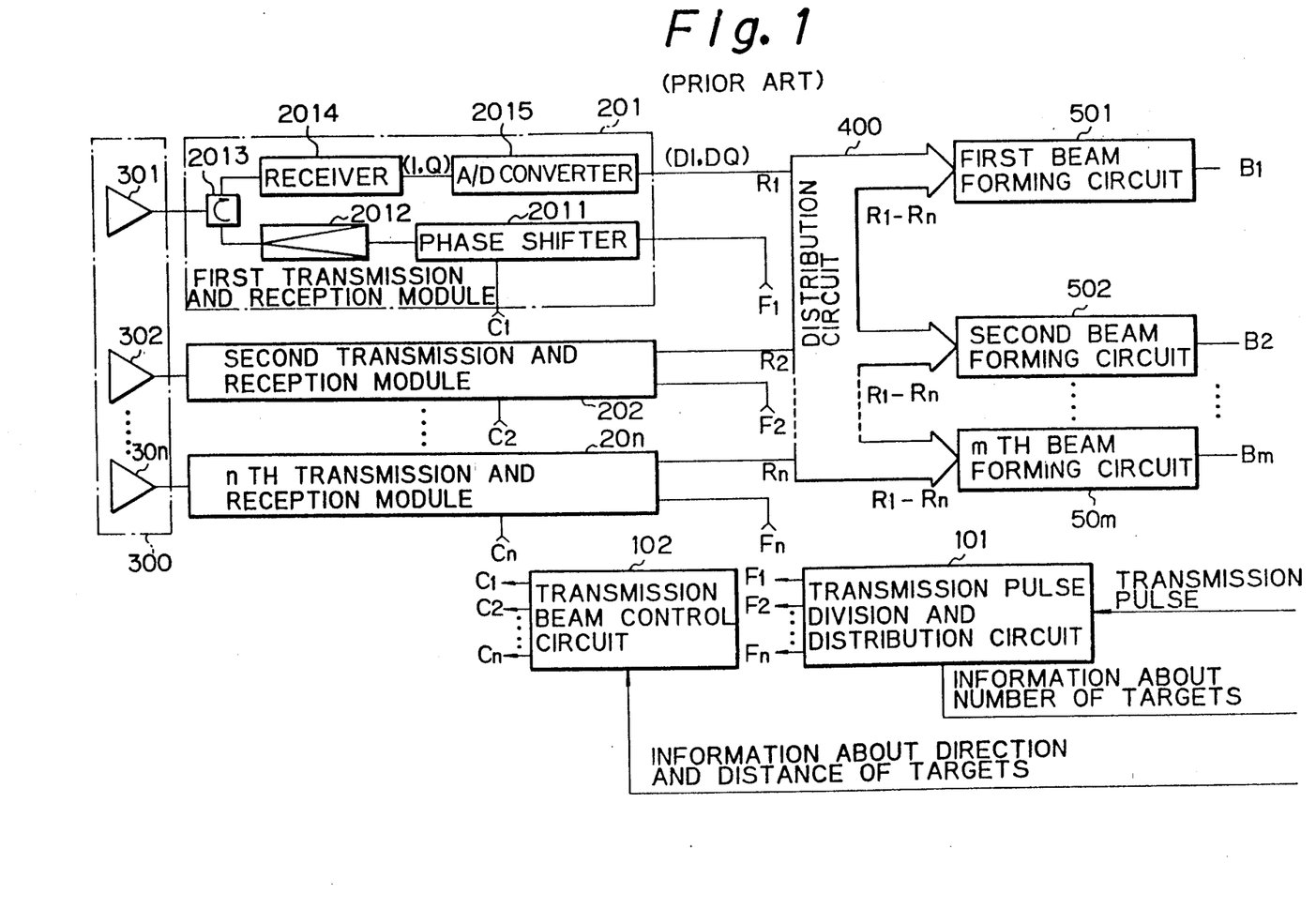
FIG. 1 is a block diagram showing the constitution of the prior art.

FIG. 1 is a block diagram illustrating such a prior radar system as disclosed in Japanese Patent Public Disclosure (Kokai) No. 63-167287 and Japanese Patent Public Disclosure (Kokai) No. 63-167288. In FIG. 1, numeral 101 designates a transmission pulse division and distribution circuit adapted to divide each of transmission pulses modulated as required and sent out from an oscillation circuit (not shown) into an optional number of sub-pulses, and to distribute and output such sub-pulses to respective phase shifters 2011 of first through n-th transmission and reception modules 201-20n. Division into sub-pulses as above mentioned is executed in accordance with information about a number of targets transmitted from a reception beam processing apparatus (not shown) of the radar system. Numeral 102 designates a transmission beam control circuit adapted to establish phase shifting amounts at respective phase shifters 2011 of the first through n-th transmission and reception modules 201-20n in respect of the divided respective sub-pulses. These phase shifting amounts are determined in accordance with information about direction and distance of targets transmitted from the reception beam processing apparatus (not shown).

The above-mentioned first through n-th transmission and reception modules 201 through 20n are arranged in relation to respective element antennas 301-30n of an array antenna 300, and control emission of transmission beams to the targets (not shown) through the respective corresponding element antennas and receive the waves reflected from the targets covered by the transmission beams respectively.

These modules will next be explained in detail by taking the first transmission module 201 as an example. The module 201 consists of the phase shifter 2011 adapted to execute a phase shifting process on the respective sub-pulses of sub-pulse train $F_1$ supplied from the transmission pulse division and distribution circuit 101 in an amount corresponding to the instruction $C_1$ provided from the transmission beam control circuit 102, a transmission amplifier 2012 adapted to amplify the sub-pulse which has been phase shifted, a circulator 2013 adapted to supply the amplified sub-pulse to the corresponding element antenna 301 so as to emit it to the target and take from the element antenna 301 a signal reflected from the target, a receiver 2014 adapted to phase-detect the reflected signal (high frequency signal) received through the element antenna 301 and circulator 2013 and separate the signal into the elements I (In phase) and Q (Quadrature) containing amplitude and phase information, and an A/D converter 2015 adapted to quantize the phase-detected signal in terms of the elements I and Q by converting them into digital signals. The digital signals (DI, DQ) which have been thus converted are sent to a distribution circuit 400 as reception data $R_1$ from the modules 201.

Similarly, digital reception data $R_2$ through $R_n$ from the second through n-th modules 202 through 20n are sent to the distribution circuit 400.

The distribution circuit 400 is adapted to combine the reception data $R_1$ through $R_n$ from the respective modules 201 through 20n and distribute them as a set in an optional number "m" in this embodiment. The set of the reception data $R_1$ through $R_n$ is transmitted to each of first through m-th beam forming circuits 501-50m.

The beam forming circuits 501-50m are adapted to control as desired the amplitude and phase of the reception data $R_1$-$R_n$ and thereby provide reception beams in the desired directions.

Figure 2A:
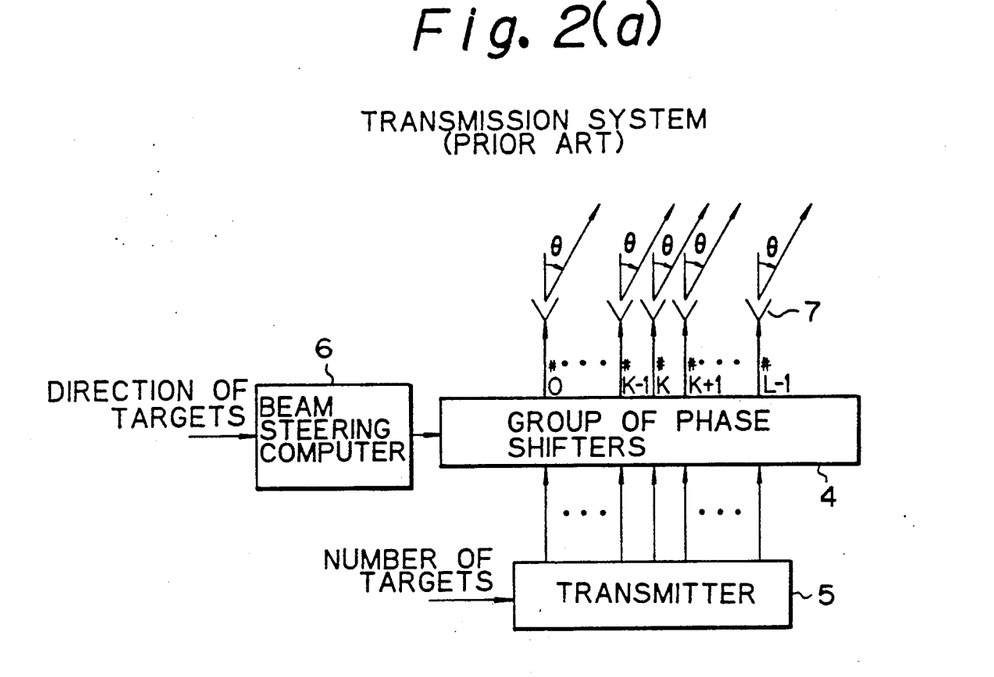
FIGS. 2(a) and 2(b) are block diagrams showing the constitution of the transmission system and the reception system of other example of a prior art.
Figure 2B:
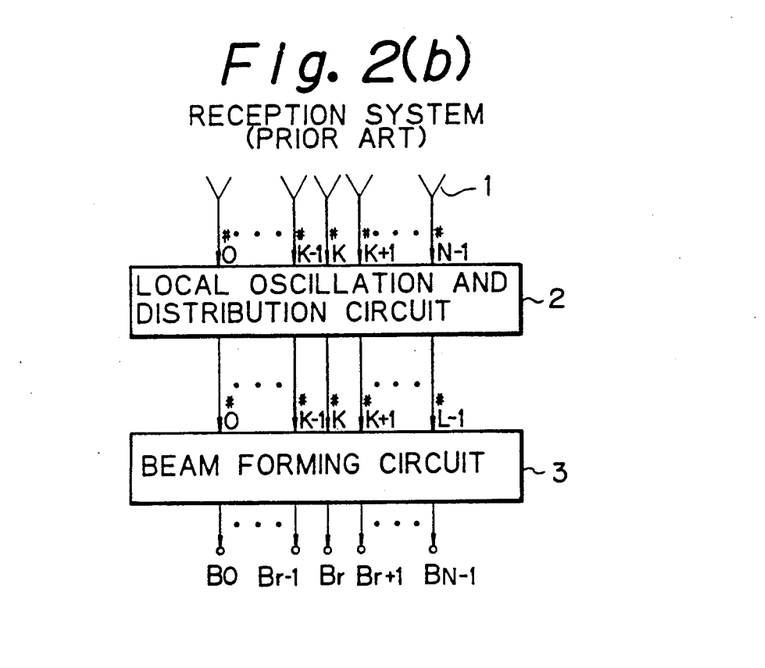

FIGS. 2(a) and (b) are block diagrams illustrating transmission and reception systems of a holographic radar as disclosed in Japanese Patent Public Disclosure (Kokai) No. 63-187180 as the other example of the radar system. Compared to the example shown in FIG. 1 wherein the array antenna is sphered for both transmission and reception, the present example includes two array antennas respectively for transmission and reception. In FIG. 2(a) illustrating the transmission system, numeral 4 designates a group of phase shifters, numeral 5 a transmitter, numeral 6 a beam steering computer, and numeral 7 a transmission array antenna. In contrast to FIG. 1, the group of phase shifters 4 correspond to the respective phase shifters 2011 of the first through n-th transmission and reception modules 201-20n. The transmitter 5 corresponds to the oscillation circuit and the like (not shown) in FIG. 1 and the transmission pulse division and distribution circuit 101. The beam steering computer 6 corresponds to the transmission beam control circuit 102 and the transmission array antenna 7 corresponds to the array antenna 300. In FIG. 2(b) illustrating the reception system, numeral 1 designates a reception array antenna, numeral 2 a local oscillation and distribution circuit, and numeral 3 a beam forming circuit. In contrast to FIG. 1, the reception array antenna 1 corresponds to the array antenna 300. The local oscillation and distribution circuit 2 corresponds to the respective receivers 2014 of the first through n-th transmission and reception modules 201-20n, the respective A/D converters 2015 and the distribution circuit 400. The beam forming circuit 3 corresponds to the first through m-th beam forming circuits 501-50m.

Figures 3A, 3B, 3C:
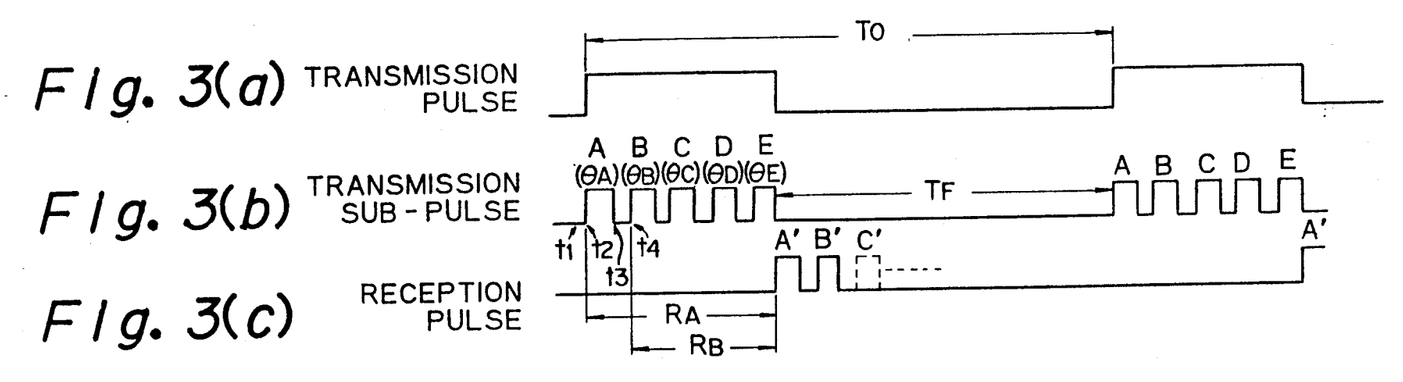
FIGS. 3(a) through 3(c) are timing charts for explaining operation of the prior art.

According to the radar system as shown in FIG. 1 or 2 wherein the phased array antenna for transmission and the digital beam forming antenna for reception capable of forming multiple beams are utilized, it is possible to observe the targets present in a plurality of different directions within a pulse repetition cycle $T_o$ by dividing a transmission pulse (shown in FIG. 3(a)) into the sub-pulses A, B, C, D and E as shown in FIG. 3(b) equivalent to the number of reception beams to be formed, continuously transmitting them in the respective target directions $\theta_A$, $\theta_B$, $\theta_C$, $\theta_D$ and $\theta_E$ and receiving the reflected wave A', B'... from the targets in the non-transmitting period $T_F$ within the pulse repetition cycle $T_o$ as shown in FIG. 3(c).

According to this prior art, the number of the targets which can be treated or observed is limited to the number of the reception beams. Even if the number of reception beams may be increased, the pulse width of the transmission pulse, or a transmission period in the pulse repetition cycle $T_o$ has to be made wider due to an increase in the number of sub-pulses. In this case, since no pulses can be received during the transmission period due to the influence of transmission output energy, the pulse reflected from targets located near to the radar system cannot be received, and therefore, it is difficult to detect such targets.

SUMMARY OF THE INVENTION

It is an object of this invention to provide a radar system which corrects the problems set forth above and is capable of observing many targets without increasing the number of sub-pulses and of easily detecting targets located near thereto.

This object is achieved by a radar system including subtraction control means which calculate a subtraction reference number of transmission sub-pulses for each target in accordance with the Doppler frequency of the target and obtain a required number of sub-pulses to be transmitted within each of the transmission period in accordance with the subtraction reference number for each target, and adjust a transmission beam direction for each sub-pulses, means for controlling the transmission timing of the subtracted transmission sub-pulses, and means for controlling a transmission beam in a direction toward each target in accordance with the timing and the adjusted direction toward the target provided by the substraction control means.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENTS

Figure 4:
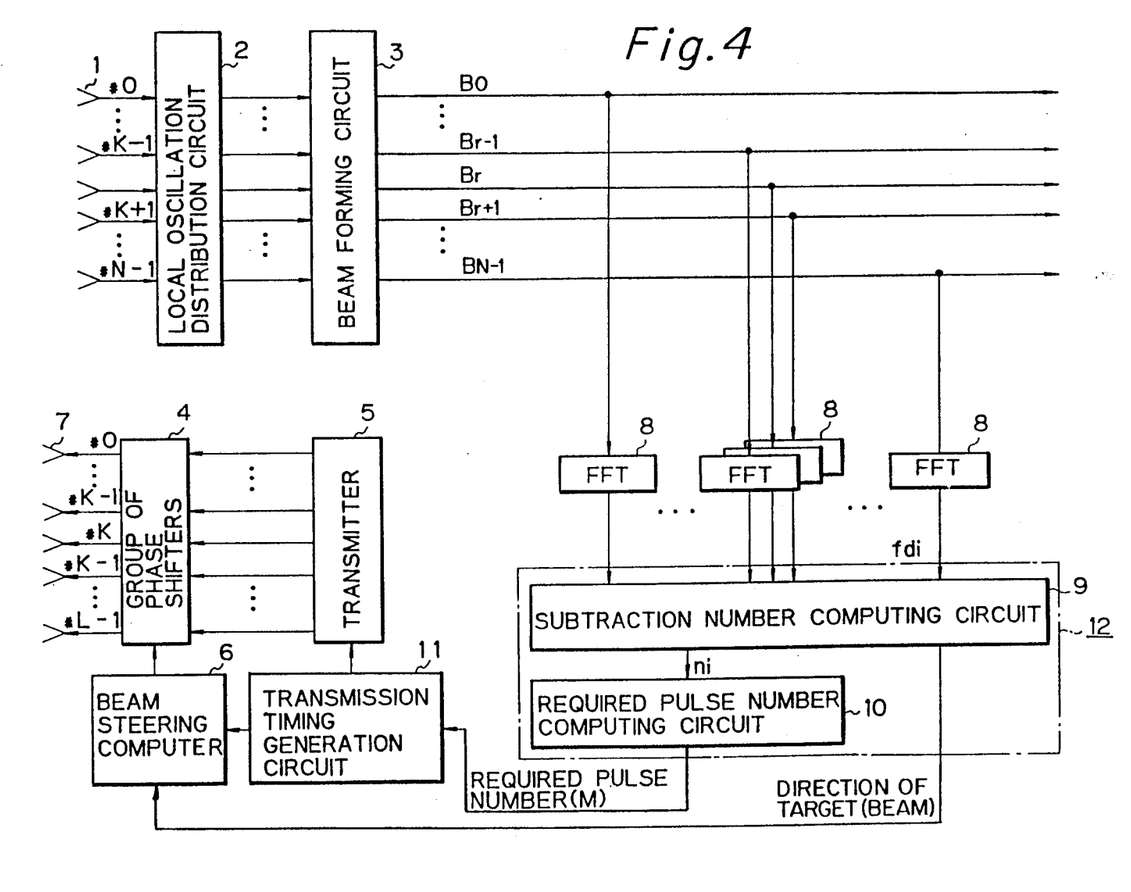
FIG. 4 is a block diagram showing an embodiment of the present invention.

FIG. 4 is a block diagram showing an embodiment of this invention. In this drawing, the same components as shown in FIGS. 2(a) and (b) are denoted by the same numerals, and numerals 8 through 12 denote fast Fourier transformers (FFTs), a subtraction reference number computing circuit, a required pulse number computing circuit, a transmission timing generation circuit and a subtraction control circuit, respectively.

The FFTs 8 are disposed for the respective outputs of reception beams $B_o$ through $B_{N-1}$ provided by the beam forming circuit 3 and detect Doppler frequencies (speed information) of the targets by analyzing the frequency of the beam outputs $B_o$ through $B_{N-1}$ respectively and fast-Fourier-transforming them. The Doppler frequency $f_d$ is represented in the following conventional manner: $f_d = 2V/\lambda$ where V is a radial speed of the target and $\lambda$ is the transmitted wave length.

The substraction reference number computing circuit 9 computes the reference number of subtractions of transmission sub-pulses ($n_i$) for each target (or beam) by using an equation, which will be described later, in accordance with the Doppler frequency $f_d$ detected by each of the FFTs 8. The circuit 9 also outputs a target direction signal for each target (or beam) in accordance with the subtraction in order to adjust the direction of the transmission beam.

The required pulse number computing circuit 10 calculates the required number of sub-pulses (M) based on the number of subtraction for each target output from the subtraction computing circuit 9. The computed required number of sub-pulses is then sent to the transmission timing generation circuit 11.

The computing circuits 9 and 10 form the subtraction control circuit 12.

Figure 5:
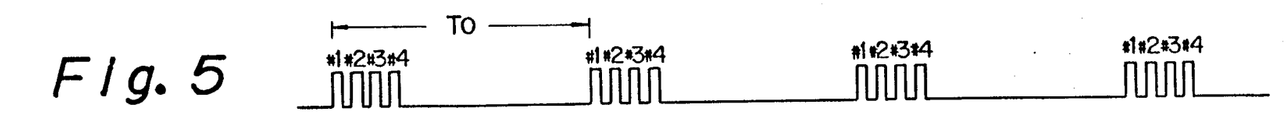
FIGS. 5 and 6(a) through 6(f) are timing charts for explaining operation of the embodiment.

Based on this information of the required number of pulses, the transmission timing generation circuit 11 generates a transmission timing signal, as shown in FIG. 5, to the transmitter 5 for controlling transmission timing of the pulses, the number of which is provided from the computing circuit 10 as the required number. The timing signal is also supplied to the beam steering computing circuit 6, whereby the circuit 6 is controlled thus setting timing of the amount of phase shift into the group of phase shifters 4 based on the target (beam) direction signal received from the subtraction reference number computing circuit 9. Namely, the timing generation circuit 11 also controls the data transfer timing between the beam steering computing circuit 6 and the phase shifters 4.

Figure 6A:
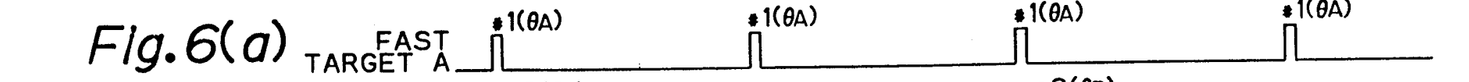
Figures 6B, 6C:
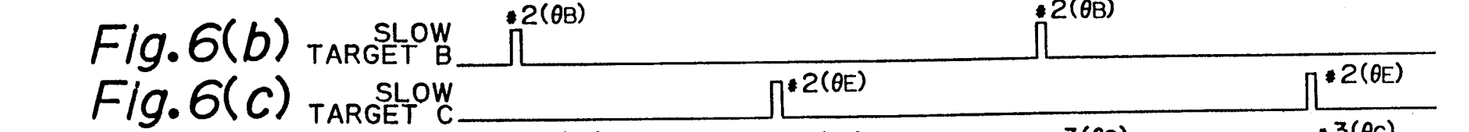
Figure 6D:
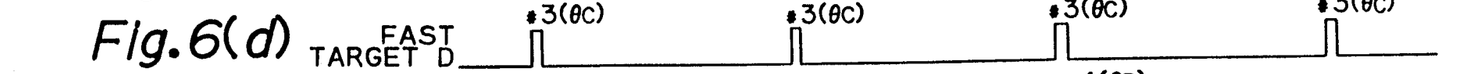
Figure 6E:
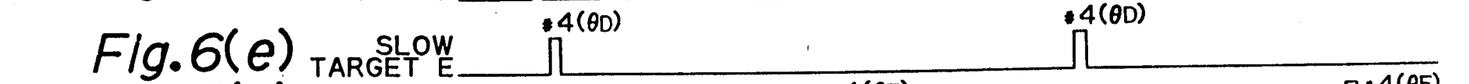
Figure 6F:
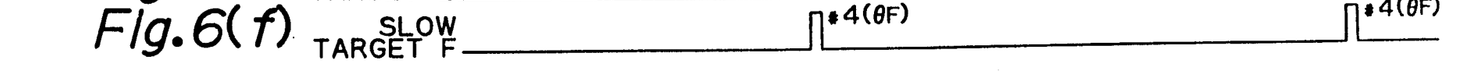

More specifically, as illustrated in FIGS. 6(a) through 6(f), fast moving targets (fast targets) A and D are observed every transmission and reception cycle $T_o$ as shown in FIGS. 6(a) and (d), while with regard to slow moving targets (slow targets) B, C, E and F, the subpulses are substracted depending on the radial speeds of the respective targets within an extent such that ambiguity in Doppler frequency may not be caused, whereby a plurality of slow targets may be observed by way of a certain numbered transmission sub-pulses. For example, the slow targets B and E may be observed by using #2 and #4 sub-pulses respectively in the odd-numbered transmission cycles, and the targets C and F may be observed by using #2 and #4 sub-pulses respectively in the even-numbered transmission cycles as shown in FIGS. 6(b), (c), (e) and (f).

In this time sharing manner, a plurality of slow targets may be observed by using a certain i-th sub-pulse for the targets, and therefore many fast and slow targets may be observed without increasing the number of transmission sub-pulses. Accordingly, since it is not necessary to increase the number of sub-pulses, it is possible to easily observe the targets which may be located at a short distance from the radar system. According to the prior art, five targets only could be observed by use of five sub-pulses as shown in FIG. 3, on the other hand, according to this embodiment, for example six targets may be observed by use of four sub-pulses as shown in FIGS. 5 and 6.

It will next be explained how to calculate the required number M of pulses at the computing circuit 10 as well as the subtraction reference number $n_i$ at the computing circuit 9.

Assuming the Doppler frequency of a target covered within a beam is $f_{di}$, a sampling interval required so as not to cause ambiguity may be presented by the following equation due to the sampling theorem:

$$\Delta t \leq \frac{1}{2f_{di}}$$

Accordingly, the allowable subtraction reference number $n_i$ for the Doppler frequency $f_{di}$ will be expressed as follows by using the transmission and reception cycle $T_o$ (in FIG. 5):

$$n_i = \left[ \frac{\Delta t}{T_o} \right] = \left[ \frac{1}{2T_o f_{di}} \right]$$

where [ ] represents the maximum integer which does not exceed the value in [ ] and thus $n_i$ is the maximum integer which does not exceed the value $1/(2T_o f_{di})$ in [ ]. The subtraction reference number $n_i$ means that the sub-pulse transmission to the target in question is made once for each $n_i$ times of pulse transmission.

This obtained subtraction reference number $n_i$ is output from the computing circuit 9 to the required pulse number computing circuit 10, and the required pulse number M is decided in accordance with the following equation:

$$M = \left\{ \sum_{i=0}^{N-1} \frac{1}{n_i} \right\}$$

where { } represents the minimum integer which exceeds the value in { }.

If subtraction control is executed in the manner as described above, the sampling interval and the number of sub-pulse hitting are subjected to change depending on the Doppler frequencies of the targets. Accordingly, the number of input samples of FFTs for the respective reception beam outputs will also be changed depending on the radial speeds of the respective targets, whereby the operational load of the FFTs will be unbalanced.

This will make it difficult to differentiate between fast and slow targets. In other words, it means that expensive frequency analyzing means capable of fast processing such as FFTs have to be provided for all the reception beam outputs $B_o$ through $B_{N-1}$.

Figure 7:
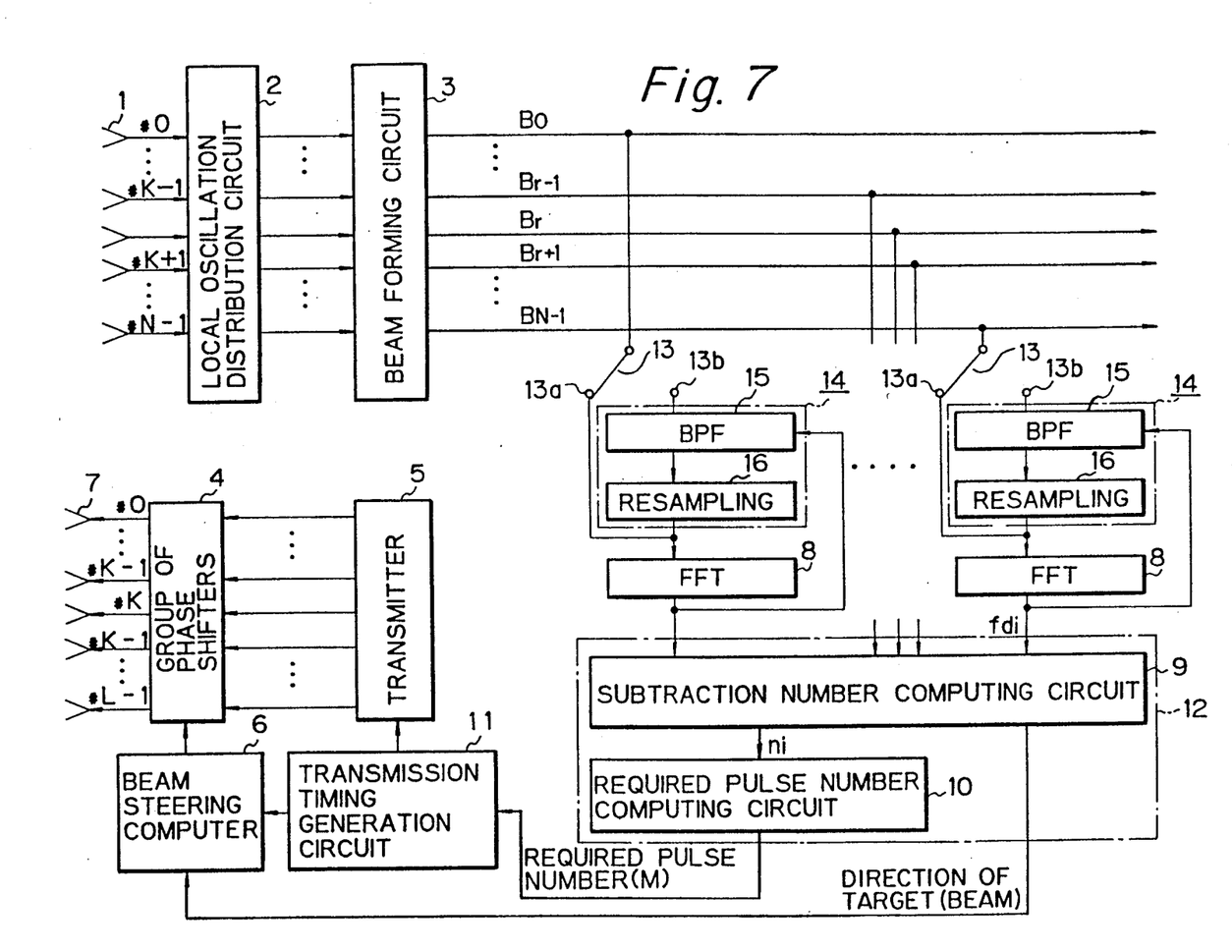
FIG. 7 is a block diagram showing another embodiment of this invention.

FIG. 7 shows another embodiment of this invention which can overcome such problems as described above. In this second embodiment, change-over switches 13 and pre-processing circuits 14 each comprising a band pass filter (BPF) 15 and a resampling circuit 16 are incorporated between the outputs of the beam forming circuit 3 and the FFTs 8 respectively. In the initial transmission and reception cycle, the switches 13 are connected to the FFTs 8 through fixed terminals 13a thereof to transfer the beam output $B_o$ through $B_{N-1}$ to the corresponding FFTs 8, and a similar operation to the first embodiment is executed. The Doppler frequencies determined at the FFTs 8 are supplied to the respective BPFs 15 to establish the central frequencies at the BPFs 15.

After the initial cycle, in the succeeding cycles, the respective switches 13 are connected to their fixed terminals 13b to feed the beam outputs $B_o$ through $B_{N-1}$ to the BPFs 15, thus enabling signal band ranges for fast targets to be restricted. The outputs from the BPFs 15 are then supplied to the resampling circuits 16 and resampled thereat so that sampling rates for the fast targets are restored to ones equivalent to those for slow targets.

This will permit the number of input samples to the FFTs to be kept constant regardless of the radial speeds of the targets, whereby the operational load may be made uniform. In other words, a slower application of the frequency analyzing means may be utilized in the second embodiment.

Since lowering the sampling rate by means of the BPF and resampling circuit as mentioned above is included in a well-known technology for pre-processing of signals, detailed operation thereof is not explained in this specification.

Although, in the above-described embodiments, FFT has been employed as a frequency analyzing means adapted to detect Doppler frequencies from the output of respective reception beams, MEM (Maximum Entropy Method) may be used as well. Also, although, in the above-described embodiments, FFT has been provided exclusively for subtraction control, it is also possible to use the FFTs for processing reception beams at a later stage as well as for subtraction control. Furthermore, in such a case as frequency analyzing means such as FFTs have already been used in the reception beam processing apparatus, it is not necessssary to additionally provide such means but is possible to share existing one.

Although the subtraction reference number computing circuit 9 and the required pulse number computing circuit 10 which constitute the subtraction control means 12 may be embodied by a circuit including various sorts of computing elements executing the above-described methods, it is also possible to attain the purpose in accordance with programs by using a microprocessor. It should also be understood that the transmission timing generation circuit 11 and the beam steering computer 6 may be realized by a constitution substantially similar to that of the prior art except for the input.

Furthermore, although the above-mentioned embodiments are applied to such a system as shown in FIG. 2, it can be applied also to such a system as shown in FIG. 1 in which the array antenna is shared for both transmission and reception.

Although the illustrative embodiments of the present invention has been described in detail with reference to the accompanying drawings, it is to be understood that the present invention is not limited to that precise embodiment. Various changes or modifications may be effected therein by one skilled in the art without departing from the scope or spirit of the invention.

What is clamied is:

1. A radar system comprising:
    transmission means having a phased array antenna for transmitting beams toward respective targets during each of transmission sub-cycles of transmission/reception main cycles in accordance with transmission pulses generated in each of said sub-cycles;
    reception means having a digital beam forming antenna capable of forming multiple beams for receiving waves reflected from said targets during each of reception sub-cycles of said main cycles;
    means for detecting Doppler frequencies ($f_{di}$) of said respective targets based on signals corresponding to said formed beams;
    subtraction control means for calculating a subtraction reference number ($n_i$) of said transmission pulses for each of said targets in accordance with said detected Doppler frequency ($f_{di}$) and then a required number (M) of transmission pulses to be transmitted for each of said transmission sub-cycles in accordance with said subtraction reference number ($n_i$) so as not to cause ambiguity on said detected Doppler frequencies, and for determining a beam direction for each of said transmission pulses;

means for controlling the transmission timing of said transmission pulses in accordance with said required number (M);

means for controlling a direction of each of transmission beams in accordance with said determined beam direction, in synchronism with said transmission timing; whereby a plurality of slow moving targets are alternatively observed for a plurality of said main cycles.

2. A radar system according to claim 1 further comprising pre-processing means disposed prior to said Doppler frequency detecting means for making a number of signals to be processed at said detecting means uniform.

3. A radar system according to claim 2, wherein said pre-processing means comprises band pass filters the central frequencies of which are controlled to coincide with said Doppler frequencies of said respective targets and resampling circuits for resampling outputs of said band pass filters to restore sampling rates for fast moving targets to one equivalent to that for slow moving targets.

4. A radar system according to claim 2 further comprising switches for transferring said signals corresponding to said formed beams to said Doppler frequency detecting means during the initial main cycle and to said pre-processing means during the other main cycles.

5. A radar system according to claim 1, wherein said subtraction reference number ($n_i$) of said transmission pulses is calculated as follows:

$$n_i = \left[ \frac{1}{2T_o f_{di}} \right]$$

where $T_o$ is a time period of said main cycle, and [ ] represents the Gaussian symbol, and said required number (M) of transmission pulses is calculated as follows:

$$M = \left\{ \sum_{i=0}^{N-1} \frac{1}{n_i} \right\}$$

where { } represents the minimum integer which exceeds the value therein.

6. A radar system according to claim 1, wherein a phased array antenna is commonly utilized for said transmissin antenna and said reception antenna.

* * * * *